Inventors:
Edward J. Kelch,
David A Sergent,
by Paul C. Frank
Their Attorney.

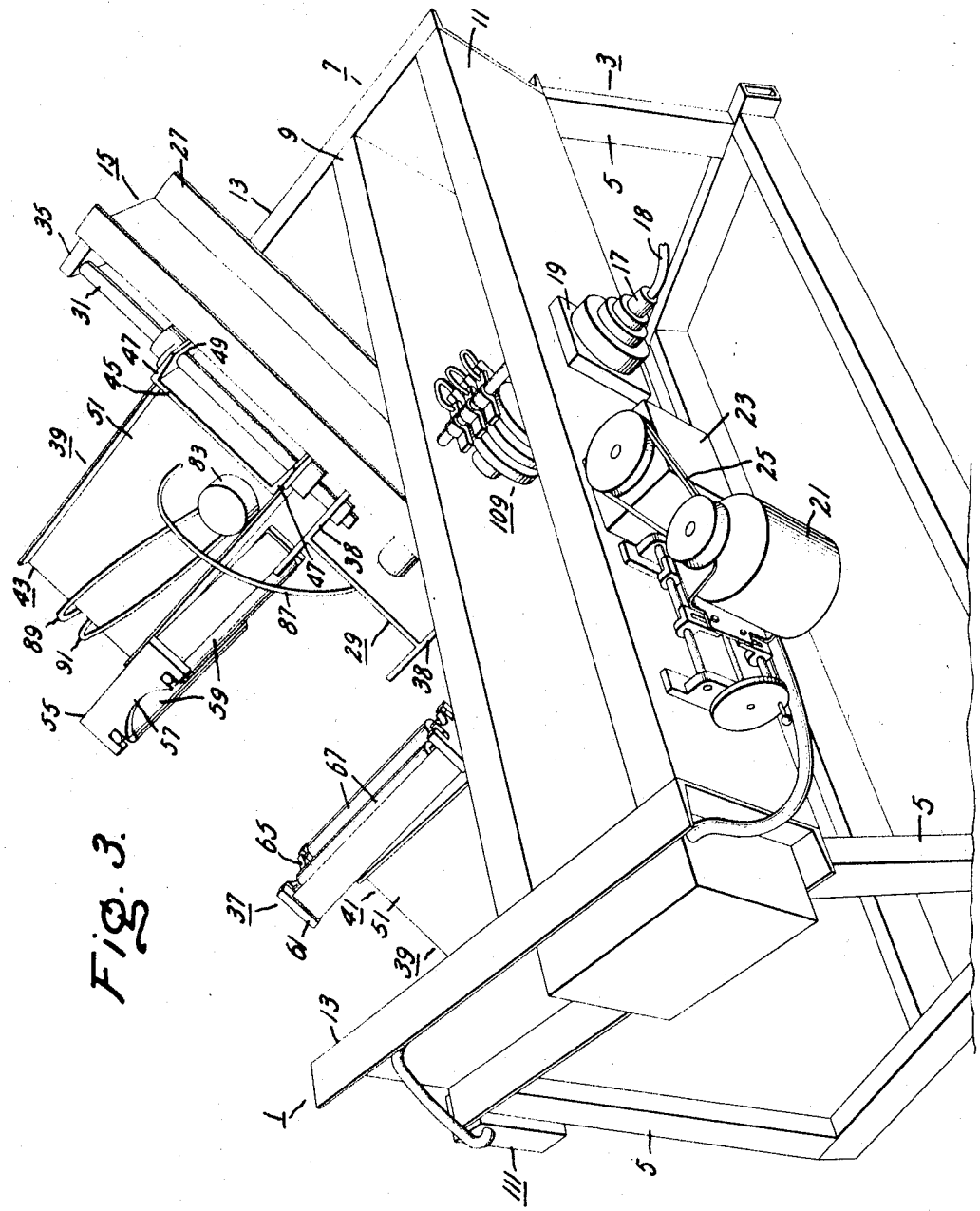

United States Patent Office 3,457,899
Patented July 29, 1969

3,457,899
APPARATUS FOR CLAMPING AND ROTATING STATORS
Edward J. Kelch, Scotia, and David A. Sergent, Schenectady, N.Y., assignors to General Electric Company, a corporation of New York
Filed June 23, 1967, Ser. No. 648,407
Int. Cl. B05c 11/14; B25b 5/14
U.S. Cl. 118—503
5 Claims

ABSTRACT OF THE DISCLOSURE

An apparatus for clamping and rotating stators includes a rotatable turret mounted on a frame member and driven by a variable speed drive motor; a pair of opposed clamping jaws, which are transversely movable and rotatably mounted on the turret; and a pair of resilient, stator engaging rollers on each clamp jaw. The turret carries an air motor and valve arrangement to control lateral jaw movement and an air indexing solenoid and valve arrangement to control rotary jaw movement.

---

This invention relates to apparatus for clamping and rotating stators and, more particularly, to such apparatus which provides complete flexibility for clamping and manipulating a wide variety of stator configurations.

There are presently known many techniques for coating and impregnating structures such as stators with an insulating varnish or resin or the like. Typically, such methods of varnish or resin treatment require much equipment and consume an average of six to twelve hours per stator. Recently, however, an improved treating process, as provided in the copending application of R. M. Elsworth, Ser. No. 481,612, filed Aug. 23, 1965, now abandoned, and assigned to the same assignee as the present invention, has been developed which eliminates much of the equipment required by the prior art and which permits faster and more economical varnish treatment of such structures.

This improved varnish treatment comprises the steps of rotating a stator and, simultaneously, providing electrical resistance heating power to the coils of the stator, preferably from an alternating current, supplied through a rotating connection. Infrared detector or sensor means are provided which are directed to control the degree of heating, and time sequence control apparatus may be provided for timing the application of heating currents. At the end of a preheating period, an amount of varnish is caused to be dispensed. During dispensing of the varnish, the infrared sensor means maintains the electrical resistance heating current at a desired temperature to facilitate impregnation of the particular insulating varnish. After the desired amount of varnish or insulating liquid is applied, the resistance heating current is changed to provide a suitable baking or curing temperature for a period of time suitable for the particular liquid used. The entire process for a typical stator from the time it is mounted until it is completely cured is about fifteen minutes.

The apparatus disclosed in the above-mentioned application for effecting the impregnation process is particularly adaptable to new motor stators which consist only of the core and the winding. Because the core is generally round, it can be easily processed and manipulated by rotating it during the application and cure of the resin without the necessity of additional means for clamping or additionally controlling the movement thereof. There occur, however, many situations where it is often desirable, or even necessary, to process a stator, new or used, in its own frame. Since the configuration of such stators with the associated frames is generally nonround and can range over a wide variety of possible shapes, it is highly desirable to have an adjustable apparatus which can manipulate any nonround stator configuration.

It is, therefore, an object of this invention to provide an apparatus for clamping and rotating stators or the like having a wide variety of configurations.

In accordance with our invention in one form thereof, we provide an apparatus for clamping and rotating a stator or the like comprising a motor-driven, rotatable turret which is supported on a frame member and which includes opposed clamping jaws for receiving therebetween a stator to be rotated. Control means are provided to move laterally and rotatably the clamping jaws so that a wide variety of configurations may be supported for subsequent manipulation.

Other objects and advantages of the present invention may better be understood by reference to the following detailed description when taken in connection with the accompanying drawings in which:

FIGURE 3 is a rear view of the clamping and rotating apparatus.

Figure 1:
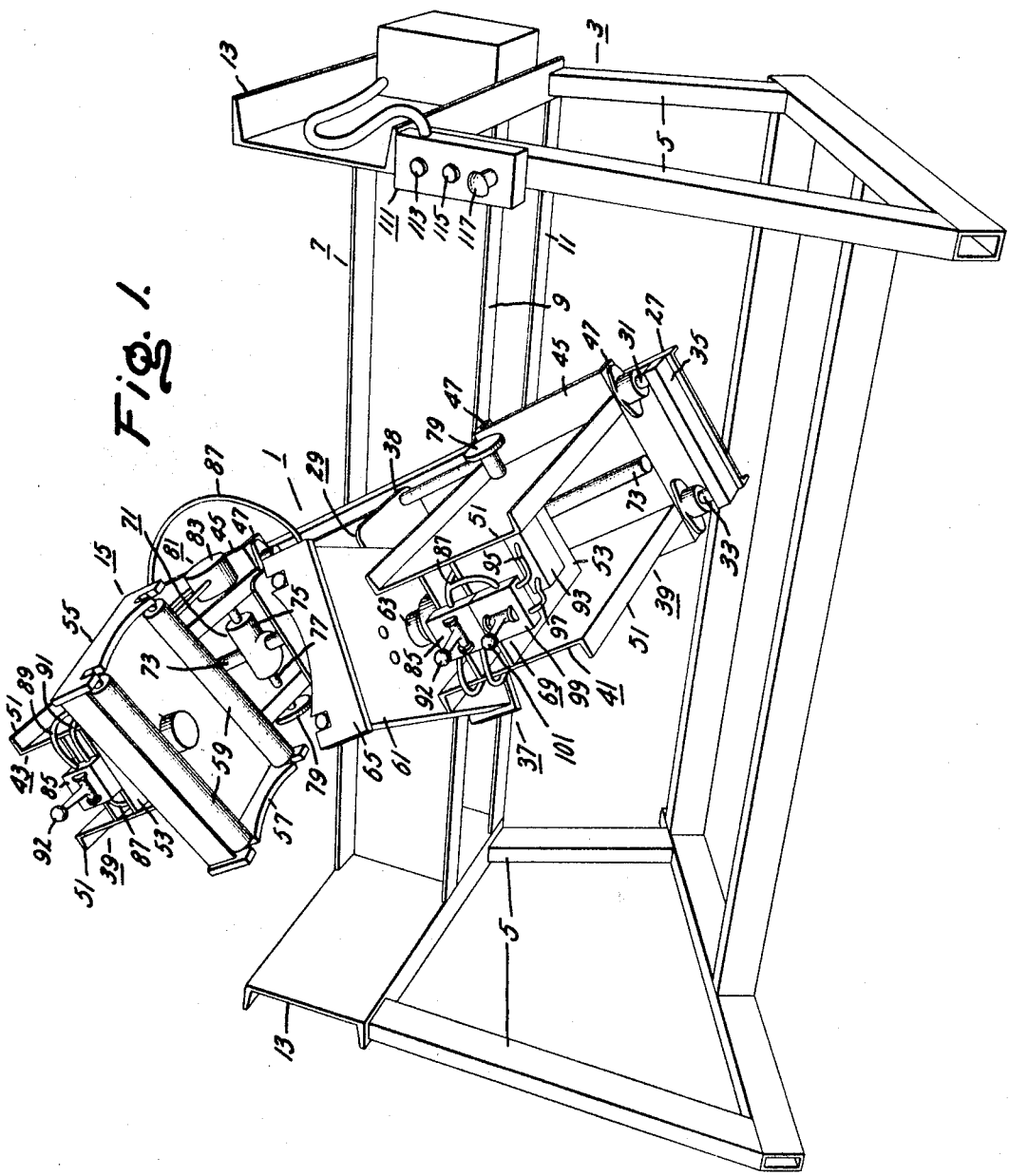
FIGURE 1 is a perspective view of the clamping and rotating apparatus of the present invention.
Figure 2:
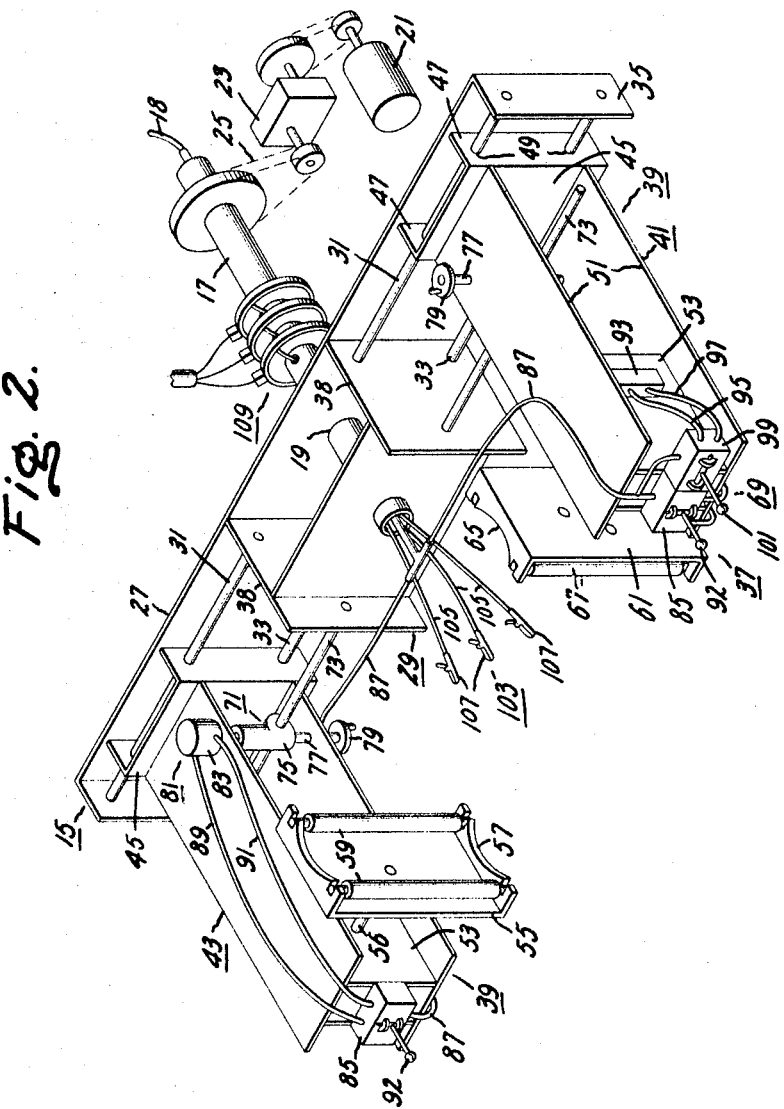
FIGURE 2 is a perspective view of the rotatable turret for the clamping and rotating apparatus.

FIGURES 1, 2, and 3 reveal the clamping and rotating apparatus 1 of the present invention. The apparatus 1 is adapted to be used especially with the novel varnish impregnation method described in the copending Elsworth application, but it is clearly understood that it is not limited thereto. For such a process, appropriate equipment must be provided. A pressure feed tank (not shown) with suitable varnish or resin is provided and an applicator or the like is connected to the pressure feed tank so that the resin can be directed to the appropriate portions of a stator to be treated. An optical sensing cell (not shown) is also provided to pick up a target on the inner surface of a winding of the stator so that an operator applying resin or the like will have a proper indication of when sufficient resin has been applied so that the curing cycle may be initiated, and an indication as to when the curing cycle should be terminated. This equipment, however, does not constitute any part of the present invention and is described only to give those skilled in the art an indication of a particular application of the apparatus of the present invention.

The clamping and support apparatus 1 comprises a stationary frame member 3 including four supporting legs 5 which support an inclined U-shaped support base 7 including a bite portion comprising a pair of spaced walls 9 and 11, respectively, and a pair of leg portions 13. A rotatable turret 15 is rotatably supported on the support base 7 of the frame member 3 by means of a rotatable shaft 17 through which an air supply 18 passes and which is journalled in suitable bearings 19 in the walls 9 and 11 of the support base 7. The shaft 17 is adapted to be rotated by means of an electric motor 21 or other energy source through a variable speed control 23 and belts or chains or other power train 25. An elongated turret base member 27 is connected to the shaft 17 for rotation therewith adjacent the inner wall 9 of the support base 7 of the frame member 3. The turret base 27 includes a centrally located hub member 29 connected near the end of the shaft 17. Pairs of spaced, parallel slide shafts 31 and 33 extend from each side 38 of the central hub 29 outwardly to be connected with flanged portions 35 of the turret base 27. Clamping means 37 are provided including slide members 39 designated as a right hand slide member 41 and a left hand slide member 43, respectively, which slide along the slide shafts 31 and 33 between the flanged portion 35 of the turret base 27 and a side wall 38 of the hub 29. Each slide member 39 comprises a rear vertical slide plate 45 having flanged portions 47 including apertures 49 for receiving the respective slide shafts 31 and 33, and a pair of spaced parallel plates 51 extending outwardly from the rear plate 45. A spacer plate 53 is provided near the ends of the parallel plates 51 to separate them. Suitable control means, to be described, are provided to adjust and control the movement of the slide members 39 along the slide shafts 31 and 33.

The clamping means 37 also includes a first rotatable clamp member, designated the left hand clamp member 55, which is rotatably supported by the left hand slide member 43 by means of a rotatable shaft 56. The clamp member 55 includes a jaw portion 57 which supports a pair of spaced parallel rollers 59. A second rotatable clamp member, designated the right hand clamp member 61, is rotatably supported by the right hand slide member 41 by means of a second rotatable shaft 63. The right hand clamp member 61 also includes a jaw portion 65 supporting a pair of spaced parallel rollers 67. The rollers 59 and 67 preferably include resilient insulating material which surrounds a central shaft so that they may firmly engage a stator when the stator is properly positioned. The clamp members 55 and 61 are disposed on the respective slide members 41 and 43 in opposing relation to each other and cooperate to trap therebetween a stator firmly enough so that the stator may be easily rotated when the turret 15 is rotated.

Control means 69 are provided to selectively position the clamping means 37. The control means 69 are adapted to adjust both the lateral position of the slide members 41 and 43, and, effectively, the lateral position of the clamp members 55 and 61, and the rotatable movement of the clamp members 55 and 61 so that the clamp members may be utilized to support a variety of stator configurations or other devices to be treated. The lateral movement of the left hand slide member 43 is controlled by a worm gear jack arrangement 71 comprising a jack shaft 73 which extends outwardly from a side wall 38 of the hub 29 and between the parallel plates 51 of the slide member 43. A worm gear jack 75, such as model 1802, produced by the Duff-Norton Company, Charlotte, N.C., is disposed around the jack shaft 73 and includes a central shaft portion 77 which spans the parallel plates 51. One end of the shaft portion 77 of the worm gear jack 75 includes a handwheel 79 for manually operating the worm gear jack 75 so as to move the slide member 43 laterally. The other end of the shaft portion 77 of the worm gear jack 75 is operated automatically by a rotatable air motor and valve control arrangement 81. The air motor arrangement 81 includes an air motor 83 which operates directly on the shaft portion 77. The air motor 83 is controlled by an air motor control unit 85 mounted on the spacer plate 53 of the left hand slide member 43. The air motor control unit 85 comprises a three-way air indexing valve (not shown) such as a model HF4-1-3, manufactured by Airmatic Valve, Inc., Cleveland, Ohio. A suitable hose connection 87 provides an air supply to the control unit 85. Suitable hose connections 89 and 91 are also provided from the air indexing valve within the control unit 85 to the air motor 83 so that the slide member 43 may be caused to move in either direction depending upon the selected valve orientation. The orientation of the valve is regulated by an operating lever 92 which forms part of the air motor control unit 85. The right hand slide member 41 is also provided with a similar worm gear jack arrangement 71 and air motor and valve control arrangement 81 for controlling the lateral movement thereof.

The rotational movement of the right hand clamp member 61 is regulated by an air indexing solenoid 93 which controls the rotational movement of the connecting shaft 63. Suitable hose connections 95 and 97 connect the air indexing solenoid 93 with an air indexing control unit 99 which is also supplied with air from the common air supply hose connection 87. The air indexing control unit 99 is operated by means of an operating lever 101 for controlling the rotation of the right hand clamp member 61 in either direction. The left hand clamp member 55, however, is freely rotatable so that there is an added degree of freedom provided in the control arrangement 69 to accommodate configurations of an even wider variety. Thus, the left hand and right hand clamp members 55 and 61, respectively, are both opposed to each other and are laterally movable relative to each other. In addition, the left hand clamp member 55 is freely rotatable whereas the right hand clamp member 61, while being rotatable, is also controllable so that it may be locked in a selected rotational position.

For implementing the particular impregnation process previously described, means 103 may be provided on the apparatus for heating the stator coils. The means 103 comprises three conductors 105 which extend outwardly from a hollow central section of the rotatable output shaft 17 and which are rotatable therewith. The wires 105 include connectors 107 at the ends thereof for engagement with the stator coils so that the coils may be heated to a desired temperature.

A suitable slip ring arrangement 109 may be utilized for connecting a conventional power source (not shown) so that the drive motor 21, means 103, and the other requisite controls may be powered. A control panel 111 is provided so that the rotation of the turret 15 and the energization of the stator windings may be controlled by the operator. Switch buttons on the control panel 111 comprise a "jog" button 113, and a continuous rotation button 115. To carry out the particular impregnation process described in the Elsworth patent application, a pressurized resin applicator connected to a suitable resin tank may also be provided, as mentioned previously, and, therefore, a resin applicator button 117 might also be provided. Also, as mentioned previously, an optical temperature sensor is provided which would be directed onto the stator windings to provide an indication of the temperature at the windings.

In operating the clamping and rotating apparatus, turret 15 is first rotated into position for reception of a suitable stator. The "jog" switch 113 is energized to provide power for rotating turret 15 in an intermittent or "jog" manner so that turret base 27 is positioned horizontally with respect to the floor. In this position, left hand clamp member 55 is at the nine o'clock position and right hand clamp member 61 is at the three o'clock position. The space between the clamp members 55 and 61 is then adjusted by use of the indexing valves through operation of the air motor control units 85 so that it is several inches wider than the diameter of the stator to be treated. The right hand clamp member 61 is then released for rotation by actuation of the air indexing solenoid 93 through operation of control unit 99 and clamp member 61 is rotated until clamping rollers 67 are parallel with the floor. Lever 101 is then released so that clamp member 61 is locked in this position. The left hand clamp member 55 may then be manually rotated to this position. Since it is free moving it does require locking. A stator is then transferred into the space between clamp members 55 and 61 by suitable hoisting means such as a rope sling, C hook, or the like, and clamp members 55 and 61 are then moved so as to positively engage the stator by use of the air motor control units 85 on the respective clamp members. The stator is centered at this time so that it is properly aligned for rotation. A visual lineup has proved to be sufficient. Each hand wheel 79 may then be turned several turns to torque up the clamping of clamp members 55 and 61 for more positive locking. Conductors 105 are then connected to the stator leads so that the windings may be heated when desired. The lifting device is removed and the right hand clamp member 61 is then released for rotation by actuation of the air indexing solenoid 43 whereupon clamp members 55 and 61 are repositioned so as to lie in a plane normal to that of operating shaft 17, which is inclined slightly upwardly. Air indexing lever 101 is then re-engaged to lock clamp member 61. Rotation of turret 15 is then initiated, the speed being adjusted by the variable speed drive arrangement mounted on the rear of the frame member.

In practice of the Elsworth process, the heat sensor is then directed toward the inner surface of the stator winding and a suitable control is connected so that a proper indication of stator winding temperature can be obtained. The windings are energized and the stator goes through a preheating cycle whereupon suitable indicating means signal the operator that the impregnation process may begin. The operator then starts applying resin to the stator winding. When sufficient resin has been applied, a baking or curing cycle is intiated by the operator to complete the process. After complete curing, the stator is ready for removal from the clamping and rotating apparatus. The operator then terminates the rotation of turret 15 and adjusts the position of turret base 27 so that it assumes a horizontal position. Conductors 105 are then disconnected from the stator winding and the lifting device is attached to the stator. The right hand clamp member 61 is reversed by actuation of the air indexing solenoid 43, whereupon the stator is lifted out of the apparatus. The apparatus is now ready for processing another stator.

While the apparatus of the present invention has been described for use with a particular process, the apparatus may obviously be used for a number of other applications. And while the particular equipment, such as the optical sensor and the resin tank, have been described, such equipment is obviously intended for use with the particular Elsworth process and it is clearly understood that the present invention is not limited thereto. Other suitable equipment or controls may be utilized in conjunction with the clamping and rotating apparatus of the present invention for a number of applications or treating processes or the like, as will be obvious to those skilled in the art. Also, it is clearly understood that the present invention is not limited to motor stators per se but can be used as well for treatment of other structures including, but not limited to, rotors, transformer coils, solenoid coils, and the like.

A particularly advantageous feature of the apparatus of the present invention is the complete flexibility and control of the clamping means so that a wide variety of nonround configurations may be positively engaged and manipulated.

What we claim as new and desire to secure by Letters Patent of the United States is:

1. An apparatus for clamping and rotating an electric motor stator or the like comprising:
    a support frame;
    an elongated base member rotatably mounted on said support frame at a central point thereof;
    drive means for rotating said base member;
    a pair of elongated and aligned slide members mounted on and extending from said base member and slidable, in a common path and in opposed directions, along the elongated extent of said base member;
    a clamp member rotatably mounted on the axial extent thereof on each of the opposed faces of said slide members whereby to clamp therebetween the article to be supported;
    each of said clamp members on the opposing faces thereof including a pair of spaced apart, substantially parallel resilient rollers, the article being clamped between said pairs of rollers; and
    automatically operated means to control the slide movement of said slide members, and the rotatable movement of at least one of said clamp members.

2. The apparatus as recited in claim 1 wherein the lateral movement of each of said slide members is effected by a jack shaft supported on said turret base, a worm gear jack mounted on said jack shaft for movement therealong, said worm gear jack including a rotatable shaft portion for operating said jack, said shaft portion engaging slide member for moving said slide member laterally as said worm gear jack is moved along said jack shaft, and wherein said clamp members are rotatably mounted on rotatable shafts supported by said slide members.

3. The apparatus as recited in claim 2 wherein automatically operated means are provided to control the lateral movement of said slide members and the rotatable movement of at least one of said clamp members.

4. The apparatus as recited in claim 3 wherein the portion of said automatically operated means for controlling the lateral movement of said slide members comprises a rotatable air motor operatively engaging and end of said shaft portion of said worm gear jack, and a control for operating said air motor comprising first hose means from an air supply, a first indexing valve connected to said first hose, second hose means connecting said first indexing valve with said air motor, and a first lever for operating said first indexing valve.

5. The apparatus as recited in claim 4 wherein the portion of said automatically operated means for controlling the rotatable movement of said one clamp member comprises an air indexing solenoid operatively connected to said clamp member, and a control for operating said air indexing solenoid comprising third hose means from the air supply, a second indexing valve connected to said third hose means, fourth hose means connecting said second indexing valve with said air indexing solenoid, and a second lever for operating said second indexing valve.

References Cited

UNITED STATES PATENTS

| | | | |
|---|---|---|---|
| 3,174,650 | 3/1965 | Bellato | 269—267 X |
| 3,200,788 | 8/1965 | Tardoskegyi | 118—54 X |
| 3,269,633 | 8/1966 | Bernier et al. | 118—54 X |
| 3,301,547 | 1/1967 | Jordan | 269—154 X |
| 1,059,545 | 4/1913 | Kunze | 269—267 X |
| 1,603,307 | 10/1926 | Anderson. | |
| 1,670,253 | 5/1928 | Gilbert et al. | 269—71 X |
| 2,446,476 | 8/1948 | Huebner | 118—53 |
| 2,685,928 | 8/1954 | Bergh | 83—465 |
| 2,727,325 | 12/1955 | Vurinic | 269—275 X |
| 2,770,557 | 11/1956 | Atti | 118—503 X |
| 2,821,160 | 1/1958 | Atti | 118—56 X |
| 2,902,973 | 9/1958 | Weingarten et al. | 118—56 |
| 3,051,124 | 8/1962 | Schfensker et al. | 118—503 |
| 3,140,087 | 7/1964 | Heath et al. | |

FOREIGN PATENTS 153,891    4/1932    Switzerland.

MORRIS KAPLAN, Primary Examiner

U.S. Cl. X.R.

269—71, 267